United States Patent [19]

Lunsford et al.

[11] 3,981,140

[45] Sept. 21, 1976

[54] GAS TURBINE ENGINE GEOMETRY CONTROL

[75] Inventors: Jimmy L. Lunsford, Plainfield; Dennis E. Schroff; David R. Steffey, both of Indianapolis, all of Ind.

[73] Assignee: General Motors Corporation, Detroit, Mich.

[22] Filed: June 23, 1975

[21] Appl. No.: 589,470

[52] U.S. Cl. .................... 60/39.03; 60/39.2; 60/39.25; 415/149 R

[51] Int. Cl.[2] .................... F02C 9/02

[58] Field of Search .................... 60/39.03, 39.2, 39.24, 60/39.25, 39.27, 39.29; 415/29, 149, 159, 162

[56] References Cited

UNITED STATES PATENTS

| | | | |
|---|---|---|---|
| 2,715,814 | 8/1955 | Barr | 60/39.2 |
| 3,025,668 | 3/1962 | Mock | 60/39.27 X |
| 3,066,488 | 12/1962 | Mock | 60/39.27 X |
| 3,138,923 | 6/1964 | Kronogard | 60/39.2 |
| 3,255,586 | 6/1966 | Hennig | 60/39.25 |
| 3,625,003 | 12/1971 | Liddle | 60/39.25 |
| 3,782,108 | 1/1974 | Holste | 60/39.2 |
| 3,795,104 | 3/1974 | McLean | 60/39.27 |
| 3,899,886 | 8/1975 | Swick | 60/39.25 |

*Primary Examiner*—Clarence R. Gordon
*Attorney, Agent, or Firm*—Paul Fitzpatrick

[57] ABSTRACT

A single-shaft gas turbine engine suited for road vehicle propulsion has variable inlet and outlet guide vanes in the compressor of the engine and a variable turbine nozzle. These variable features are called engine variable goemetry (EVG). In normal operation, the areas of the flow paths at the inlet and outlet of the compressor and of the turbine nozzle are varied with desired power level to suit varying air flow through the engine. An actuator increases the areas in response to a request for increased power output.

In a braking mode, the compressor variable geometry is decoupled from the actuator and remains at a minimum flow condition while the turbine nozzle is opened as the power request decreases below a particular low value. The opening of the turbine nozzle decreases the engine power output, thus increasing its capacity to absorb power from the vehicle. Logic circuits control the coupling and decoupling of the compressor variable geometry.

6 Claims, 6 Drawing Figures

GAS TURBINE ENGINE GEOMETRY CONTROL

Our invention relates to a mode of operation of a single-shaft gas turbine engine with engine variable geometry and to an improved combination of elements of engine variable geometry to provide for desirable load braking characteristics in the engine and for adaptation of the engine to varying levels of air flow for efficient operation over a wide range of power output.

In an engine according to our invention, the compressor of the engine has variable geometry; specifically, variable inlet and diffuser vanes which are moved concurrently to vary the air flow capacity of the compressor. It also has a variable turbine nozzle which, in normal operation of the engine for vehicle propulsion, has its area varied to accord with the air flow along with the compressor variable geometry.

To provide for braking of the vehicle, the operating mechanism for the engine variable geometry disconnects the compressor variable geometry while in the minimum air flow condition and opens the turbine nozzle, thereby increasing the power absorbing capacity of the engine.

The principal objects of our invention are to provide a gas turbine engine best suited for the requirements of vehicle propulsion, to provide an improved system for adjusting the flow characteristics of a gas turbine engine, to provide efficient operation for power delivery and effective braking of the output shaft when required, to provide an improved and particularly effective linkage interconnecting compressor and turbine inlet variable geometry mechanisms including a disconnect mechanism between the compressor and turbine variable geometry. A further object of the invention is to implement a highly desirable mode of operation of a gas turbine engine for vehicle propulsion.

The nature of our invention and its advantages will be clear to those skilled in the art from the succeeding detailed description of the preferred embodiment of the invention, with reference to the accompanying drawings thereof.

Figure 1:
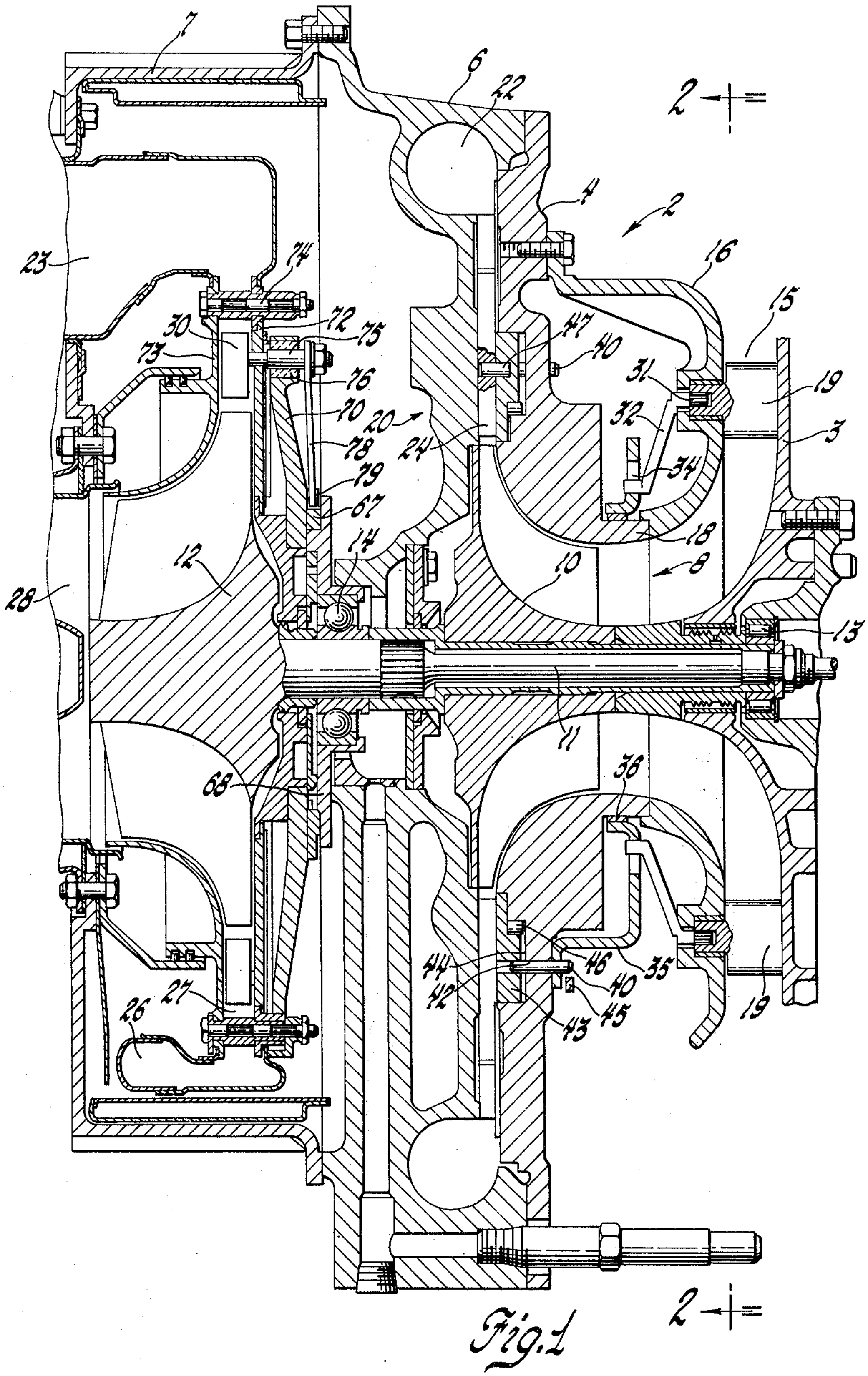
FIG. 1 is a partial sectional view of a single-shaft gas turbine engine illustrating the compressor and turbine assembly, the section being taken on a plane containing the axis of rotation of the compressor and turbine.

Referring first to FIG. 1 for a general understanding of the organization of the engine to which the invention is applied in the particular embodiment described here, the engine may have a housing or frame 2 made up of a number of castings or other parts bolted together. The parts may include a plate 3, a diffuser front wall 4, a diffuser rear wall 6, and a turbine housing as illustrated at 7. These parts 3, 4, 6, and 7 may be suitably bolted together, the details being immaterial. The engine includes a radial-flow compressor 8 having a rotor or impeller 10 which may be of usual type. The compressor rotor is fixed to a shaft 11 which extends through the rotor from a turbine wheel 12. The shaft 11 is supported in a bearing 13 in plate 3 and in a thrust bearing 14 adjacent to the turbine wheel.

Air is admitted to the compressor from an engine air inlet (not illustrated) and flows radially inward through a passage 15 defined between plate 3 and a supporting ring 16. Ring 16 is bolted to the front wall 4 and its inner margin mates with a flange 18 at the center front of wall 4. The air flows through an annular cascade of variable setting inlet guide vanes 19 which vary the swirl imparted to the air and vary the area of the passage through which it flows to the impeller 10. Air discharged from the impeller at high velocity flows through a diffuser 20 defined between walls 4 and 6. From the diffuser, the air flows into a collector or scroll 22 from which the air is directed through a recuperator (not shown) into the combustion apparatus 23 (partially shown) of the engine and thence into a turbine inlet plenum 26.

The diffuser 20 includes variable setting diffuser vanes 24 which may be moved to vary the area for flow from the compressor and also other dimensional parameters of the diffuser. The details of the variable diffuser vanes are also immaterial to this invention. They may be of any suitable type, including that shown in Duzan U.S. Pat. No. 3,799,694 issued Mar. 26, 1974. They may be of the form illustrated in a copending application of Lunsford and Nelson for Variable Diffuser, Ser. No. 585,344, filed June 9, 1975, of common ownership.

A turbine nozzle 27 discharges the gas from the inlet plenum 26 tangentially and radially into the periphery of the turbine rotor 12, from which it is discharged axially into a turbine exhaust passage 28 leading to the recuperator. The turbine nozzle includes an annular cascade of vanes 30 concurrently rotatable about axes parallel to the axis of shaft 11 to vary the area of the turbine nozzle and the characteristics of flow into the turbine.

Proceeding to more details of the engine variable geometry, each inlet guide vane 19 is fixed to a stub shaft 31 journaled for rotation about an axis parallel to shaft 11 in the supporting ring 16. A crank arm 32 is integral with each shaft 31. The arms 32 engage in slots 34 (see also FIG. 2) in an actuating ring 35. Ring 35 is mounted for limited angular rotation about the axis of shaft 11 on a bushing 36 on the exterior of flange 18. Rotation of ring 35 concurrently changes the angle of vanes 19 and varies the area for flow of air between them into the compressor.

The ring 35 is integral with two oppositely directed arms 38 and 39 which bear pins 40 to drive the mechanism for adjusting the diffuser vanes 24. Pins 40 extend through slots 42 in diffuser front wall 4 into engagement with a vane operating ring 43 which is mounted for rotation about the axis of shaft 11 in a recess 44 in the rear surface of wall 4. The two pins 40 engage stop plates 45 which define the limits of rotation of ring 35. The vane operating ring 43 may be mounted on a bushing 46. Each movable vane 24 of the diffuser is coupled to ring 43 by a pin 47. There are various arrangements of variable diffuser vanes known in the art including that of Duzan U.S. Pat. No. 3,799,694 issued Mar. 26, 1974. Many of these are suitable for incorporation into the type of engine described here and, therefore, details will not be enlarged upon.

Figure 2:
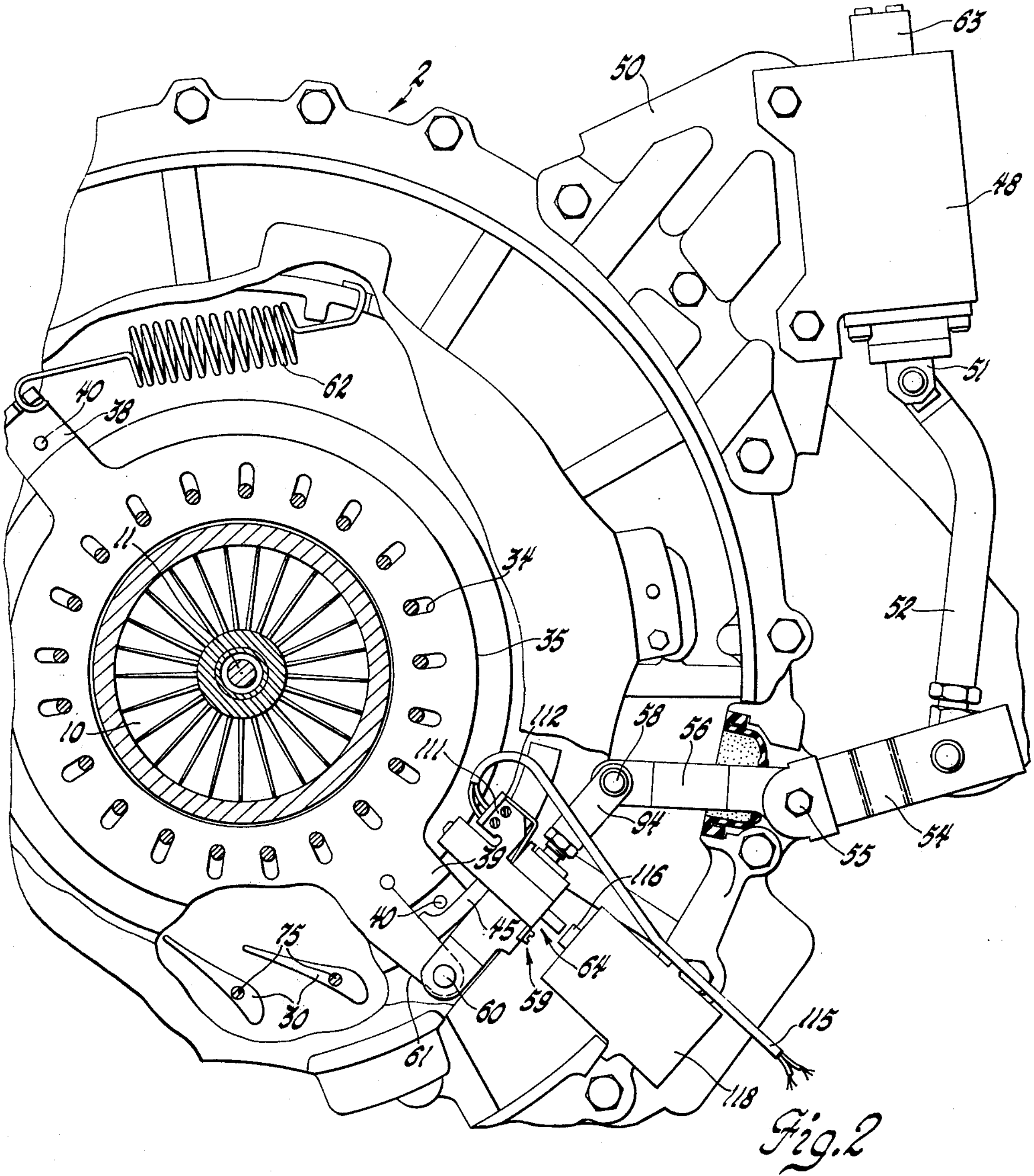
FIG. 2 is a view taken on the plane indicated by the line 2—2 in FIG. 1, with parts broken away.
Figure 4:
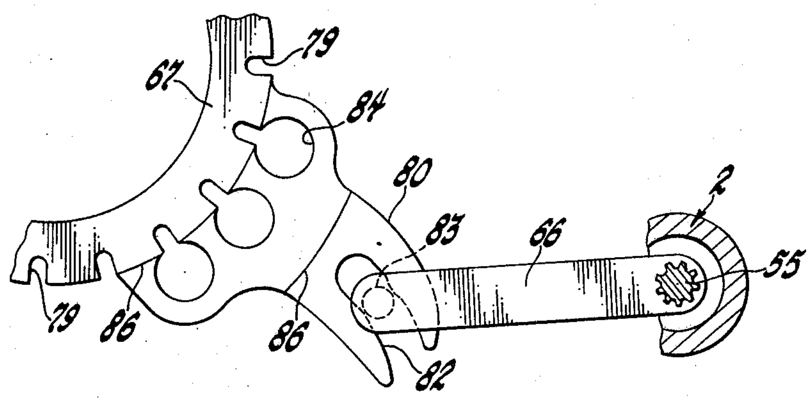
FIG. 4 is an illustration of a portion of the turbine variable geometry linkage.

To rotate the ring 35 and adjust the two sets of vanes constituting the compressor variable geometry, an electrically controlled hydraulic actuator is preferably employed. As illustrated in FIG. 2, a double-acting hydraulic cylinder 48 is fixed to a bracket 50 bolted to the engine housing 2. The piston rod 51 is coupled by a link 52 to an arm 54 fixed to a shaft 55 (see also FIG. 4). An arm 56 which may be integral with arm 54 is coupled by a hinge pin 58 to a coupler or disengageable link 59. This link is connected by a pin 60 to an arm 61 integral with the vane actuating ring 35. The vane actuating ring is biased clockwise as illustrated in FIG. 2 by a coil spring 62 connected between the arm 38 and an anchorage on the engine frame. Energization of the cylinder 48 to extend its piston rod causes arms 54 and 56 to rotate clockwise as viewed in FIG. 2, pulling on link 59 to rotate ring 35 counterclockwise against the force of the spring. Spring 62 tends to close both sets of compressor vanes. The limits of movement of the ring may be determined by a stop plate (not illustrated) cooperating with the outer end of one of the pins 40. The fulcrums of the compressor vanes may be set up such that the gas pressures on the vanes tend to bring them to the closed position, aiding the spring 62. The actuator 48 may include a position transmitter 63 such as a linear variable differential transformer to feed back a signal of the position of the engine variable geometry input to control mechanism.

The link 59 includes a coupling mechanism 64 (FIG. 3) by which the two ends of the link may be coupled or may be disconnected from each other so that the ring 35 will remain in its closed engine variable geometry position regardless of extension of the piston rod 51. This will be discussed after a brief description of the turbine nozzle variable geometry.

Shaft 55 extends parallel to the engine shaft 11 and is supported in a suitable portion of the engine housing 2. A turbine variable geometry actuating arm 66 (FIG. 4) is splined to shaft 55. Arm 66 extends generally towards shaft 11 and is coupled to a turbine nozzle vane actuating ring 67 which is rotatably mounted on the exterior of a disk 68 which mounts bearing 14. Ring 67 is held in place by an annular plate 70 forming part of the fixed housing of the turbine. The gases discharged from the turbine plenum 26 flow into the turbine between forward and rearward fixed walls 72 and 73 connected by bolts 74. The variable setting turbine nozzle vanes 30 are disposed between these walls, each vane being mounted on a shaft 75 (see also FIG. 2) extending through a ceramic bushing 76 mounted in the plate 70. An arm 78 fixed to each nozzle vane shaft 75 engages in a notch 79 in the margin of ring 67. Rotation of ring 67 thus changes the setting of the vanes 30. As will be apparent from the fragmentary view in FIG. 2, such rotation varies the spacing between the trailing edge of each vane and the adjacent vane to vary the flow capacity or the pressure drop across the nozzle.

Ring 67 is connected to its actuating arm 66 through an integral offset input arm 80 which has a cam slot 82 in its outer end to receive a roller 83 mounted on the end of arm 66. The desired relation between compressor and turbine vane movements is attained by suitable contouring of slot 82. It may be noted that entry of the vane arms 78 into the notches 79 which are aligned with the input arm 80 is provided for by cutouts 84 in the input arm 80. This arm is offset laterally as indicated by the lines 86. It will be seen that as the shaft 55 is rotated by the actuator 48, it will normally change the setting of the turbine nozzle vanes along with the compressor variable geometry. This is the situation in normal operation of the engine to propel the vehicle. The areas of compressor inlet and outlet and turbine nozzle are varied in the same sense as a function of engine power level request. To brake the vehicle, provision is made to open the turbine nozzle while leaving the compressor variable geometry closed (minimum area). This is effected by actuation of the coupling mechanism 64 in the coupler or disengageable link 59 (see particularly FIG. 3) under control of a suitable logic system.

Proceeding to the structure of the disengageable link 59 including coupler 64, this includes a body 87 of generally square cross-section having a clevis 88 at one end for connection to the arm 61 and having a central bore 90. A plunger 91 of circular cross-section is reciprocable in the bore 90. This plunger includes a stop flange 92 which normally engages one end of the body, and it is threaded for adjustable connection to a clevis fitting 94 which is coupled through pin 58 to the arm 56. Plunger 91 has a notch 95 in it upper surface for cooperation with the latch 96. The latch 96 is of rectangular outline, with a cylindrical stem 102 projecting upwardly from it. It is reciprocable in a transverse slot in body 87. A rectangular opening 103 in the latch has an upper edge which normally engages in the notch 95 to couple or lock plunger 91 to the body 87.

Figure 3:
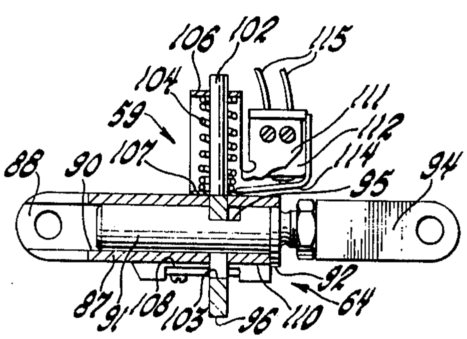
FIG. 3 is a detailed sectional view of a linkage decoupling mechanism.

The latch is biased to the position in which the latch is engaged by a compression spring 104 the upper end of which bears against a sheet metal bracket 106 and the lower end of which bears against a washer 107 seated against the upper surface of the rectangular portion of latch 96. Bracket 106 is a generally rectangular frame the lower end of which has upturned flanges 108 engaging in a longitudinally extending slot 110 in the lower edge of the body 87. The bracket is retained by screws threaded into the body. The bracket also includes ears 111 to which a miniature snap switch 112 is fixed. The snap switch includes an actuating arm 114 which is in position to be engaged by the washer 107 when the latch body 96 is moved upwardly as illustrated in FIG. 3 to disengage the plunger 91 from body 87. The switch transmits a signal that the coupler is disengaged or engaged. Specifically, the switch is closed when the coupler is disengaged. Leads 115 connect switch 112 to the logic system.

The coupler 64 is normally held engaged by spring 104 but may be disengaged by an armature 116 (FIG. 2) which is projected by an electromagnetic thruster 118. When the coil of thruster 118 is energized, the armature 116 projects upwardly, engaging the lower surface of latch 96 and pressing it upward until the lower edge of the notch 103 rises against the plunger 91. This releases the latch and allows the vane actuating ring 35 to move to a minimum area position under the action of coil spring 62. If the plunger 91 is retracted by clockwise rotation of arm 56 as shown in FIG. 2, the plunger will move outwardly in the bore 90. This allows the actuator 48 to open the turbine nozzle without concurrently opening the compressor variable geometry.

Figure 5:
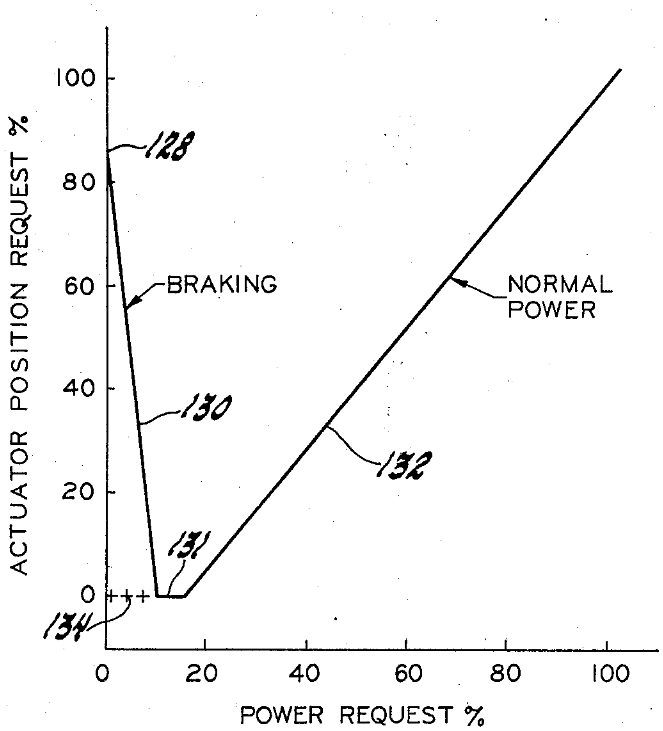
FIG. 5 is a curve illustrating the operating characteristics of the engine.
Figure 6:
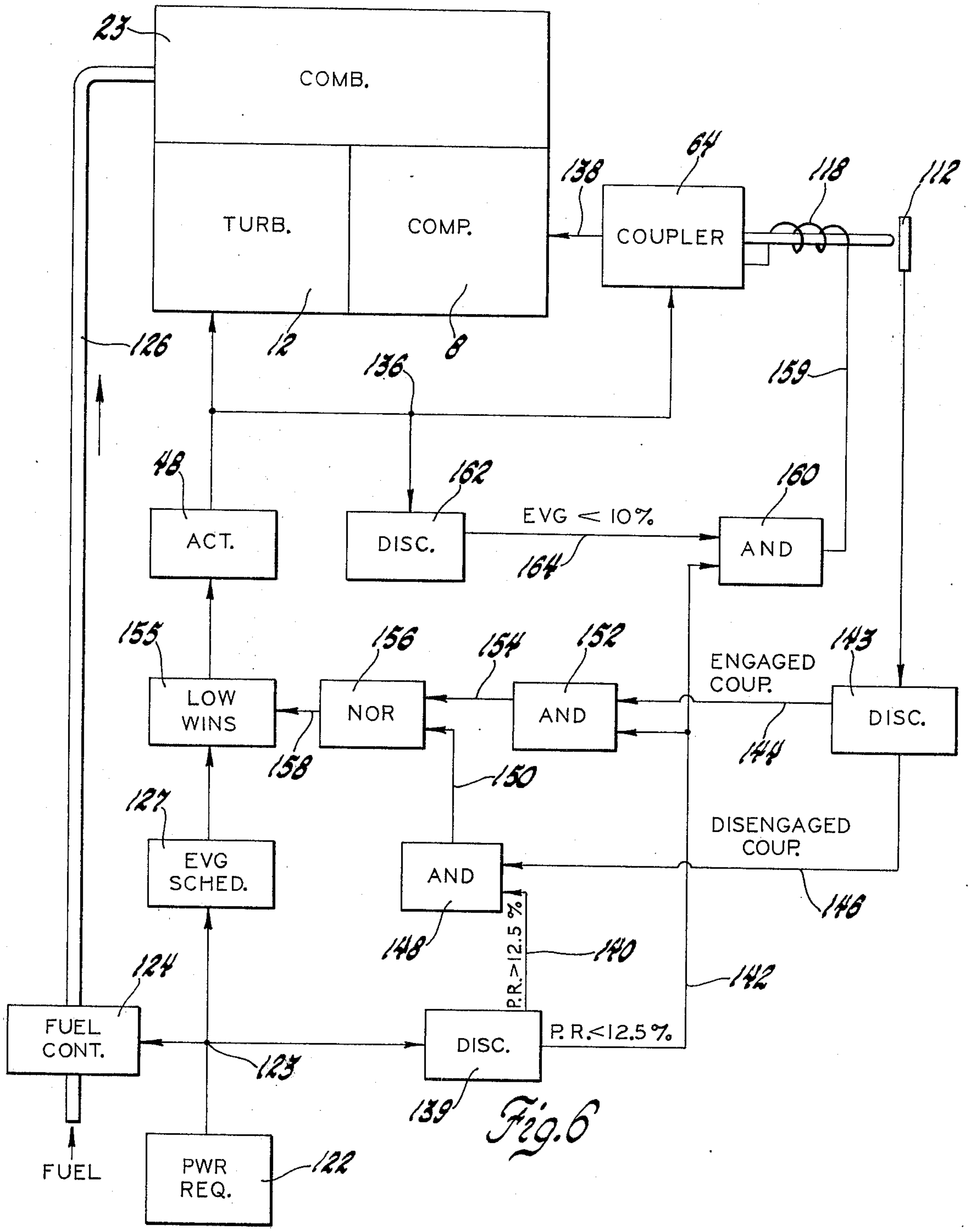
FIG. 6 is a schematic diagram of the EVG control system.

The mode of control of fuel and EVG will be more readily apparent from the control system schematic of FIG. 6 and the curves of FIG. 5. In FIG. 6, the engine, including compressor 8, turbine 12, and combustion apparatus 23 is represented schematically. The mode of operation of the engine is directed by a power request transmitter 122 which could be a foot throttle or the like or a voltage or current transducer actuated by some such mechanism as a foot throttle. In practice, preferably the power request transducer transmits a signal which is controlled by foot throttle position but which is modified by other factors which are immaterial to the present invention.

The power request transmitter sends the engine control signal through a suitable electrical, mechanical, or hydraulic transmission 123 to a fuel control 124 which may be of any suitable known type. Such a control meters fuel and delivers it through a fuel line 126 to the combustion apparatus 23 of the engine. The power request signal is also transmitted to an EVG scheduling device 127 which generates a curve of stroke of the EVG actuator 48 against power request as shown in FIG. 5. This curve, at zero power request, is at the point 128 on FIG. 5 representing open or substantially fully open position of the turbine nozzle. In the particular instance as the power request increases to 10 percent of full power, the actuator piston rod 51 is retracted as indicated by the line 130 to the zero or fully retracted position at which the opening of the EVG is at a minimum. There is a short dwell at this configuration, indicated by line 131, and then at about 15 percent power request the device 127 signals the actuator to again extend the piston rod as indicated by the line 132, which is the line for normal operation of the engine.

The actuator thus is controlled to increase both compressor EVG and turbine EVG for greater area as the power request increases up to full power. Line 131 represents a dwell range in which the transition between normal power and braking is accomplished. With the power request below 12½ percent, which is in the dwell range, the coupling device 64 is normally disengaged so that, as the actuator follows the line 130, the turbine nozzle area increases accordingly, but the compressor geometry is disconnected so the compressor geometry remains at its minimum area setting as indicated by the line segment 134. It will be seen, therefore, that the device 127 provides the schedule of actuator position as indicated by the lines 130, 131, and 132 as against the value of power request. The EVG request is transmitted to the actuator 48, which may have a valve controlled by the input and a suitable feedback from position transducer 63 (FIG. 2) to assure that the position of the actuator follows the input, as is well known to those skilled in the art and need not be described here. The connection from the actuator 48 to the nozzle vanes of the turbine 12 and to the coupling device 64 is indicated by the lines 136. This is the mechanical linkage including parts 52, 54, 55, 56, 91, 66, and 67 previously described. The connection from the coupler 64 to the compressor variable geometry including body 87 and arm 61 is indicated by the line 138 in FIG. 6.

We may now proceed to control of the compressor variable geometry and the coupler connecting it with the actuator 48. As shown in FIG. 6, the power request signal is transmitted to a discriminator 139 which provides a signal on a channel 140 when power request is greater than 12½ percent full power and a signal on a channel 142 when the power request is less than 12½ percent. The switch 112 transmits its electrical signal to a discriminator 143 which energizes a channel 144 if the coupler is engaged and a channel 146 if the coupler is disengaged. The channels 140 and 146 lead into an AND gate 148 so that this gate provides a signal in a channel 150 if power request is above 12½ percent and the coupler is disengaged. The signals in channels 144 and 142 lead into an AND gate 152 which transmits a signal through a channel 154 if the power request is below 12½ percent and the coupler is engaged. Channels 150 and 154 are connected into a NOR gate 156 which provides a zero signal in the event of energization of either channel 150 or 154 through channel 158 into the Low Wins gate 155. The result of this is that the actuator follows the EVG schedule unless gate 148 or 152 is energized, in which case the signal in channel 158 retracts the actuator 48 to its zero position for a reason which will be explained.

The thruster 118 which releases the coupler is energized through a lead 159 from an AND gate 160. This gate receives an input of power request below 12½ percent through channel 142. A signal of position of the actuator 48 is fed through channel 136 to a discriminator 162 which transmits a signal through channel 164 to the AND gate 160 when engine variable geometry is below one-tenth of full travel. Under these conditions, the AND gate transmits the signals to thruster 118 to disengage the coupler. The result of this is that the coupler cannot be disengaged unless the EVG is substantially at its fully closed position and the power request is in the range calling for minimum power, or below that calling for braking. Thus, if we assume the engine is operating normally and the power request is decreased to 12½ percent, the coupler is released to allow the compressor variable geometry to close. If power request is then further decreased scheduling device 127 causes a reopening of the turbine nozzle to reduce the power output capability of the engine to zero as the power request goes to zero.

The coupler 64 cannot relatch until engine variable geometry reaches approximately its zero condition. The logic, therefore, provides for reducing the EVG signal to zero if the power request is increased beyond 12½ percent and the coupler is disengaged. This is accomplished by a signal from gate 148 transmitted through NOR gate 156 which provides a zero signal through Low Wins gate 155 to the actuator. Also, if the power request goes below 12½ percent and the coupler is still engaged, the two inputs to the AND gate 152 energize the NOR gate 156 to transmit the zero signal to the actuator 48 through the Low Wins gate so that the EVG is reduced to its closed position and the load is taken off the latch so that it may be readily disengaged by the solenoid.

It will be seen that the logic system described provides for proper engagement and disengagement of the coupling and provides for the compressor variable geometry to follow the lines 134, 131, and 132 on FIG. 5 while the turbine variable geometry follows the lines 130, 131, and 132.

We need not and will not describe particular examples of scheduling devices, Low Wins gates, NOR gates, AND gates, and discriminators such as are shown on the schematic diagram of FIG. 6. Such devices of an electrical nature are well known, and fluidic, hydraulic, or mechanical for such purposes may be employed.

It should be apparent to those skilled in the art from the foregoing description of the preferred embodiment that our invention provides for decoupling the turbine geometry from the compressor geometry so that the engine power output may be spoiled for braking while retaining the advantages of a system in which these two are varied concurrently for modulation of engine power in a normal power output regime of operation.

The detailed description of the preferred embodiment of the invention for the purpose of explaining the principles thereof is not to be considered as limiting or restricting the invention, since many modifications may be made by the exercise of skill in the art.

We claim:

1. A method of operating a gas turbine engine including a compressor, combustion apparatus, and a turbine driving the compressor, and having variable compressor and turbine geometry, the method comprising varying concurrently the flow areas through the compressor and the turbine as a function of engine power level request in normal load-powering operation of the engine to vary the flow capacity of the engine and closing the compressor variable geometry while opening the turbine variable geometry to spoil the power output of the engine for load-braking operation of the engine.

2. A gas turbine engine comprising, in combination, a compressor, combustion apparatus supplied by the compressor, and a turbine supplied by the combustion apparatus and connected to drive the compressor and a load; the compressor including variable configuration vane means operable to adapt the compressor to varying air flow rates; the turbine including variable area nozzle means; actuating means connected to the two said variable means for concurrently adjusting them to match compressor and turbine characteristics through a range of engine power output levels; coupling means operable to decouple the compressor variable means from the said actuating means so that the actuating means is free to adjust the turbine nozzle means without moving the compressor variable means; means effective to maintain the compressor variable means in a low air flow condition when it is decoupled from the actuating means; and means effective to open the turbine nozzle while the compressor variable means is in a low air flow condition for load braking operation of the engine.

3. A gas turbine engine comprising, in combination, a compressor, combustion apparatus supplied by the compressor, and a turbine supplied by the combustion apparatus and connected to drive the compressor and a load; the compressor including variable configuration vane means operable to adapt the compressor to varying air flow rates; the turbine including variable area nozzle means; actuating means connected to the two said variable means for concurrently adjusting them to match compressor and turbine characteristics through a range of engine power output levels; coupling means operable to decouple the compressor variable means from the said actuating means so that the actuating means is free to adjust the turbine nozzle means without moving the compressor variable means; means effective to maintain the compressor variable means in a low air flow condition when it is decoupled from the actuating means; means effective to control the actuating means and the coupling means including means for transmitting an engine power request signal; means responsive to the power request signal for generating a nozzle area signal varying from high area at minimum power request to minimum area at a predetermined low power request level and then increasing area with increasing power request; and means responsive to existence of both a power request below the said level and a low air flow condition of the compressor variable means effective to disengage the coupling means.

4. A gas turbine engine comprising, in combination, a compressor, combustion apparatus supplied by the compressor, and a turbine by the combustion apparatus and connected to drive the compressor and a load; the compressor including variable configuration vane means operable to adapt the compressor to varying air flow rates; the turbine including variable area nozzle means; actuating means connected to the two said variable means for concurrently adjusting them to match compressor and turbine characteristics through a range of engine power output levels; coupling means operable to decouple the compressor variable means from the said actuating means so that the actuating means is free to adjust the turbine nozzle means without moving the compressor variable means; means effective to maintain the compressor variable means in a low air flow condition when it is decoupled from the actuating means; means effective to control the actuating means and the coupling means including means for transmitting an engine power request signal; means responsive to the power request signal for generating a nozzle area signal varying from high area at minimum power request to minimum area at a predetermined low power request level and then increasing area with increasing power request; means responsive to a power request below the said level effective to disengage the coupling means; and means responsive to a power request above the said level effective to engage the coupling means.

5. A gas turbine engine comprising, in combination, a compressor, combustion apparatus supplied by the compressor, and a turbine supplied by the combustion apparatus and connected to drive the compressor and a load; the compressor including variable configuration vane means operable to adapt the compressor to varying air flow rates; the turbine including variable area nozzle means; actuating means connected to the two said variable means for concurrently adjusting them to match compressor and turbine characteristics through a range of engine power output levels; coupling means operable to decouple the compressor variable means from the said actuating means so that the actuating means is free to adjust the turbine nozzle means without moving the compressor variable means; means effective to maintain the compressor variable means in a low air flow condition when it is decoupled from the actuating means; means effective to control the actuating means and the coupling means including means for transmitting an engine power request signal; means responsive to the power request signal for generating a nozzle area signal varying from high area at minimum power request to minimum area at a predetermined low power request level and then increasing area with increasing power request; means responsive to existence of both a power request below the said level and a low air flow condition of the compressor variable means effective to disengage the coupling means; means responsive to existence of both a power request above the said level and a disengaged condition of the coupling means to transmit a minimum nozzle area signal to the actuating means; and means responsive to existence of both a power request above the said level and a minimum nozzle area condition effective to engage the coupling means.

6. A gas turbine engine comprising, in combination, a compressor, combustion apparatus supplied by the compressor, and a turbine supplied by the combustion apparatus and connected to drive the compressor and a load; the compressor including variable inlet configuration means and variable outlet configuration means to adapt to varying air flow rates; the turbine including a nozzle means variable through two ranges of configuration, a first range to adapt to varying flow rates and a second range including a setting effective for load braking; drive means connected to the three said variable means for concurrently adjusting the three to match compressor and turbine characteristics through the first said range of turbine configuration; and means operative to disengage the compressor variable means from the said drive means so that the drive means is free to move the nozzle means to the said setting without further moving the compressor variable means.

* * * * *

UNITED STATES PATENT AND TRADEMARK OFFICE

CERTIFICATE OF CORRECTION

PATENT NO. : 3,981,140

DATED : September 21, 1976

INVENTOR(S) : Jimmy L. Lunsford et al

It is certified that error appears in the above-identified patent and that said Letters Patent are hereby corrected as shown below:

Column 4, line 20, "it" should be -- its --.

Column 8, line 3, -- supplied -- should be inserted after "turbine".

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*